May 29, 1962  J. H. ANDRESEN, JR  3,036,506

CAMERA CASE FOR UNDERWATER PHOTOGRAPHY

Filed June 15, 1959

INVENTOR.
JOHN H. ANDRESEN, JR.

BY Ostrolenk, Faber,
Gerb & Soffen
ATTORNEYS

United States Patent Office 3,036,506
Patented May 29, 1962

3,036,506
CAMERA CASE FOR UNDERWATER
PHOTOGRAPHY
John H. Andresen, Jr., Forest Knolls,
Greenwood Lake, N.Y.
Filed June 15, 1959, Ser. No. 820,229
1 Claim. (Cl. 95—11)

This invention relates to novel camera case constructions for use in underwater photography.

Rigid cases for movie or still cameras require complex sealed controls to operate them when encased underwater. Conventional rigid cases of reasonable cost are virtually impossible to seal, and their gaskets become leaky.

For underwater photography in shallow water, such as down to about sixty feet, a sealed-in bag of transparent flexible material has been used to enclose the camera. The shutter, iris, speed and film advance controls are operated manually in the water through the flexible bag. Such prior art camera case had a flat, clear glass window sealed thereto by a removable metal band.

In using the latter type of camera case, it was necessary to remove the glass window plate. A screw clamp loosened the metal band that attached the window to the bag-case. Removal of the window is of course required in such prior art camera case to replace film, or to remove the camera after use underwater. This has always been a difficult task, as the window would generally become fingerprinted on the inside, and resealing in a leakproof manner was not assured, particularly in the presence of sand.

In accordance with the present invention, the aforesaid problems and difficulties with underwater camera cases are overcome. I provide a tubular preferably transparent flexible casing at one end of which the transparent window is permanently sealed in place. The camera, movie or still, is introduced through the tube end opposite the glass window. The open end of the invention camera case is sealed in a leakproof manner by a novel clamp arrangement thereat.

In the exemplary form of the aforesaid clamp, a channel is provided into which the open tube end is flattened and double sealed through a lock bar. The invention camera case is accordingly readily sealed against water leakage in a positive manner, despite presence of sand or other contamination. The window is unfingered in the closure operation, and the case remains clean and dry inside.

The invention camera case is relatively inexpensive of construction, simple and effective to use, and remains watertight. The camera is operated through the transparent tube, and directed through the permanent window. The case interior is always maintained completely dry, with no damage to the camera, or deterioration in the picture taking.

It is accordingly a primary object of the present invention to provide a novel underwater camera case.

Another object of the present invention is to provide a novel camera case of relatively inexpensive construction and fully practical for underwater use.

A further object of the present invention is to provide a novel flexible camera case incorporating a readily operable watertight clamp.

Still a further object of the present invention is to provide a novel flexible camera case with a permanently secured window for underwater photography.

These and other objects of the invention will become more apparent from the following description of an exemplary embodiment thereof, taken in connection with the drawings, in which.

Figure 1:
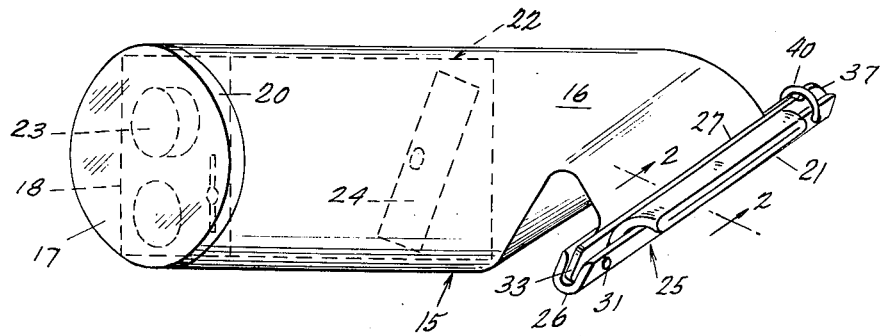
FIGURE 1 is a perspective illustration of the exemplary underwater camera case, in sealed condition.

The exemplary camera case 15 comprises a casing 16 of rubber or flexible plastic such as "Vinylite," "Mylar," polyethylene or the like. Other equivalent tough flexible, preferably transparent material may be used for casing 16. A transparent pane 17, as a circular or elliptical glass disc, is firmly secured to one end 18 of casing 16 in a leakproof manner. A metal band 20 may be used, properly gasketed with disc 17.

In accordance with the present invention, the camera is introduced into case 15 through its end 21, opposite the transparent pane end 18. A camera 22, indicated in dotted lines, is within casing 16. The casing 16 diameter or transverse cross-sectional area is made ample to accommodate the camera or cameras it is to encase, with sufficient surface flexibility to permit manual manipulation of the camera elements in its operation therein.

The lens or turret section 23 of camera 22 is positioned at or against transparent pane 17. The wind-up lever 24 is seen at the camera side. The other usual camera controls, as the shutter, iris and speed settings, control lever, film advance etc. are readily manipulated through the flexible casing 16, particularly if it is transparent, or at least translucent. This far end 21 of casing 16 is water-sealed through the clamp 25, as will be set forth in more detail.

Figure 2:
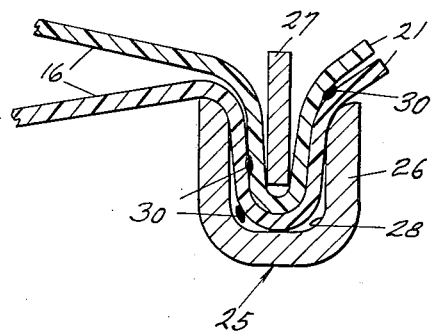
FIGURE 2 is an enlarged cross-sectional view through the camera case clamp, in closed position, taken along the line 2—2 of FIGURE 1 in the direction of the arrows.

FIGURE 2 is an enlarged cross-sectional view through clamp 25 closed on open end 21 of casing 16. The clamp 25 comprises a rigid channel shaped member or base 26, preferably of non-corrosive metal, and a coacting hinged bar 27. The end portion 21 of casing 16 is formed as a loop and is gripped between the inner faces of the side walls of channel 26 and bar 27 as shown in FIGURES 1 and 2. The width of the groove 28 at the interior of channel 26 is proportioned for a press fit or firm compressive squeeze of the two sections of casing end 21 gripped therein by transverse bar 27, and to effect a stable water-tight seal thereof.

The flexible casing 16 is thus doubly sealed at its open end 21 by my novel effective clamping arrangement hereof. Such double sealing of end 21 affords double protection against water leakage. I have found that tight sealing is accomplished readily and directly with my clamp 25 even with sand particles 30 present. The flexible material 16 of the casing, when pressed into the tight fitting groove 28 of channel 26 by bar 27 forms an excellent thorough double water seal for the case 15.

Figure 3:
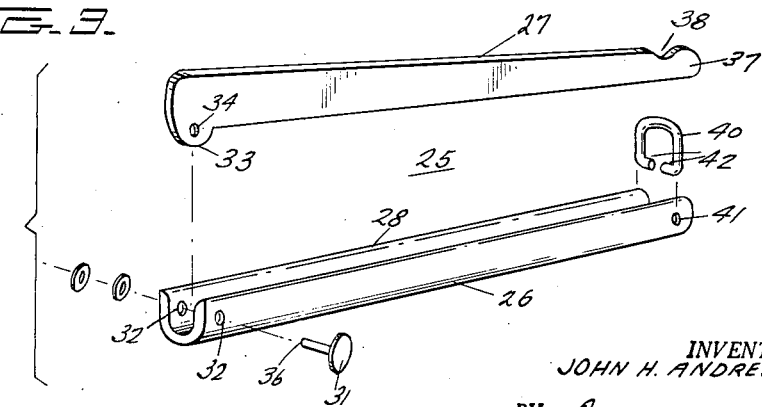
FIGURE 3 is an exploded perspective view of the camera case clamp hereof.

FIGURE 3 is an exploded illustration of one form which the clamp 25 hereof may assume. The lock-bar 27 is pivoted at one end of channel 26, on pivot shaft 31. Shaft 31 extends through apertures 32, 32 in the channel 26 end, along axis $a$, $a$. The bar 27 has a lug end 33 with an opening 34 through which pivot shaft 31 passes. A washer 35 is placed on each side of bar portion 33 within channel 26, along shaft 31 all on common axis $a$, $a$ as indicated in the figure. The shaft 31 may be in the form of a rivet, with its end 36 peened over against a side of channel 26.

The opposite end 37 of bar 27 has a notch 38. A wire bail 40 is pivotally mounted in apertures 41 in channel 26 along axis $b$, $b$. The turned in ends 42, 42 of bail 40 grip into apertures 41 along the axis $b$, $b$. The wire bail 40 swings over bar 27 end 37 and is proportioned to snap into notch 38 thereof to hold the bar 27 firmly in the closed or locked position, as shown in FIG- URES 1 and 2, when the doubled end 21 of the casing is in place. In this manner the clamp is locked in its water-tight mode, as described hereinabove. All the clamp components are preferably made of non-corrosive metal.

The camera case 15 may be readily opened even while wet. The clamp end 21 is held downwardly with the pane 17 upwardly. The clamp 25 is then opened by unhitching the wire bail 40 from notch 38. The bar 27 pivots open, and the clamp 25 is removed. The camera 22 is removed through the dry opened end 21 of casing 16. When the camera is reloaded and/or rewound it may be directly replaced within casing 16. The clamp 25 is replaced at casing end 21 preferably slightly closer to the window (17) end 18 of the casing when wet. In this manner the interior of the case is maintained completely dry.

It is also obvious that my novel enclosure arrangement is such that the clamp 25 may be fastened at varying distances from the open end. This makes possible a positioning of the clamp and control of the entrapped air volume to obtain neutral buoyancy, an advantage to the diver. This feature also makes possible the accommodation of different sizes of camera.

Although I have set forth my invention in connection with an exemplary embodiment thereof, it is to be understood that variations and modifications may be made therein that fall within the broader spirit and scope of the invention, as defined in the following claim.

I claim:

A camera case of the character described for underwater photography comprising a flexible tubular transparent casing proportioned to loosely subtend the camera and having an open end projecting substantially beyond the camera section, a transparent window pane permanently fastened to the other end section of said casing with a leak-proof seal, and removable clamping means for said open end arranged to effect a water-tight sealed closure thereof, said clamping means comprising a channel member having spaced side walls and a bar movable into position between said side walls and spaced therefrom to sealingly compress a loop of said casing at said open end folded around said bar, and said loop having adjacent areas pressed sealingly against the interior faces of said side walls by said bar, and means for pivoting said bar to said channel member at one end thereof and means for locking said bar to said channel member at the other end thereof with said loop sealingly clamped in said channel member.

References Cited in the file of this patent
UNITED STATES PATENTS

| | | |
|---|---|---|
| 1,535,312 | Hosking | Apr. 28, 1925 |
| 1,836,142 | Waller | Dec. 15, 1931 |
| 2,537,303 | Cobb | Jan. 9, 1951 |

FOREIGN PATENTS

| | | |
|---|---|---|
| 744,934 | France | Jan. 31, 1933 |
| 821,235 | Great Britain | Oct. 7, 1959 |